G. F. SMITH.
BAKER'S OVEN.
APPLICATION FILED APR. 11, 1921.
1,401,823.
Patented Dec. 27, 1921.
3 SHEETS—SHEET 1.
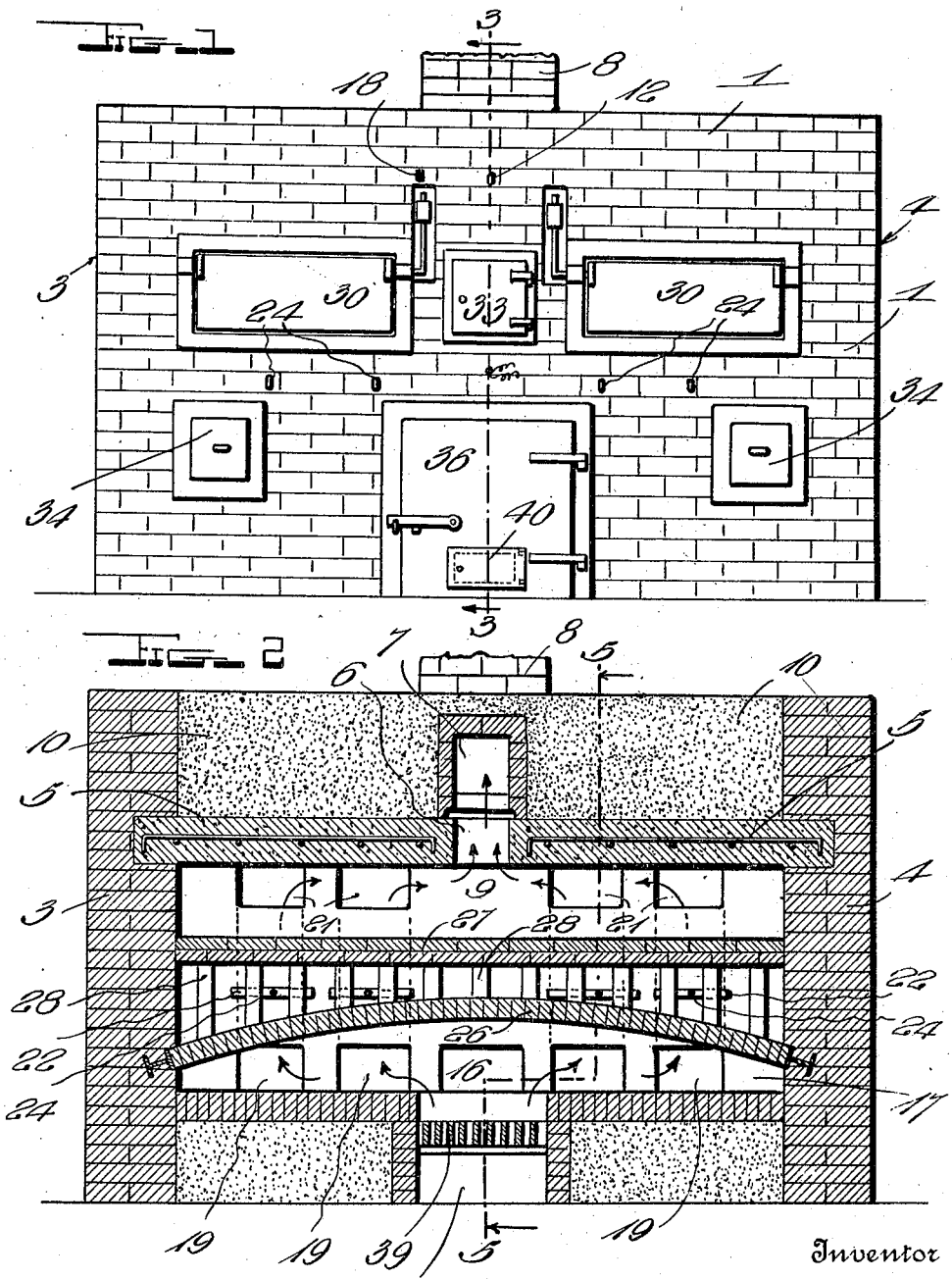
Inventor
G. F. Smith
By H. B. Willson & Co.
Attorneys G. F. SMITH.
BAKER'S OVEN.
APPLICATION FILED APR. 11, 1921.
1,401,823.                            Patented Dec. 27, 1921.
3 SHEETS—SHEET 2.
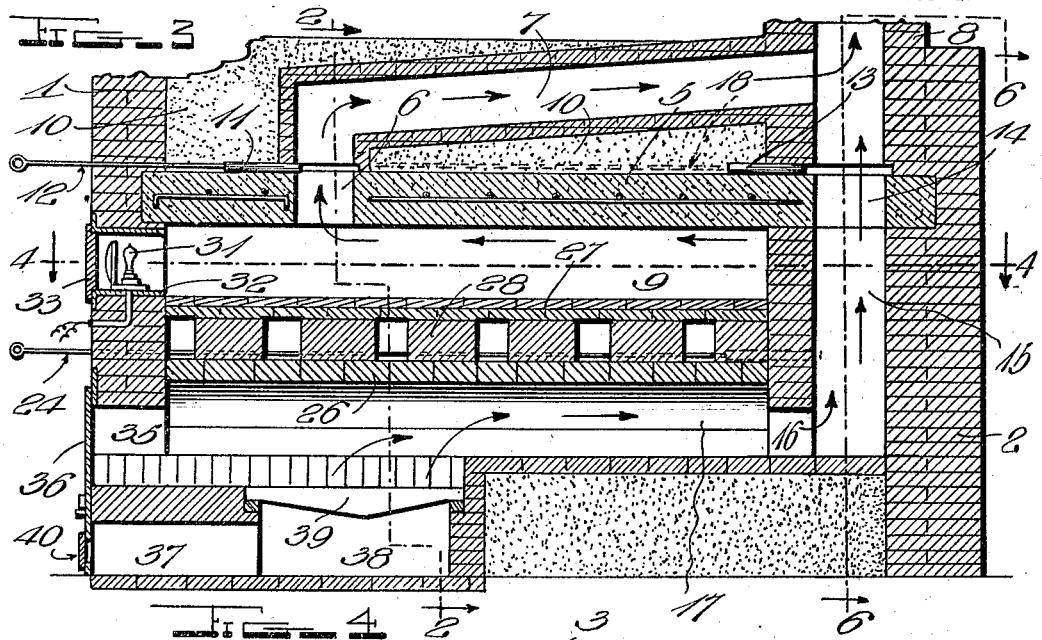
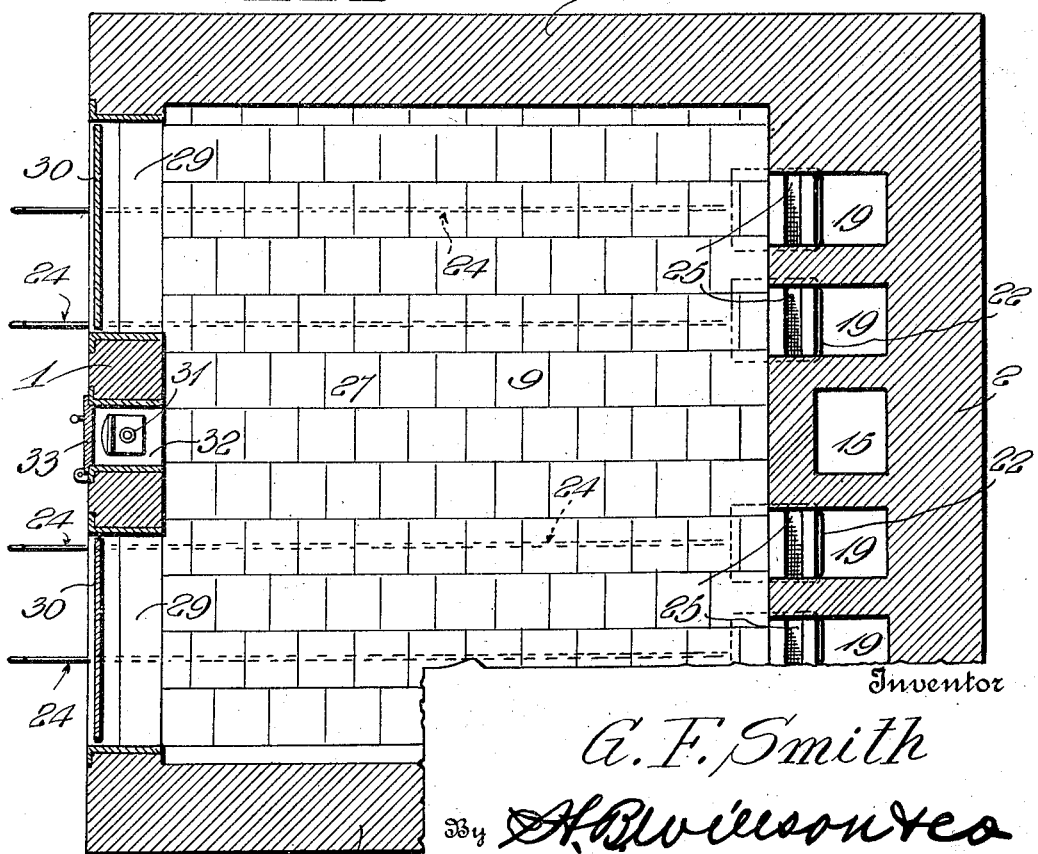
Inventor
G. F. Smith
By H. B. Wilson &co
Attorneys

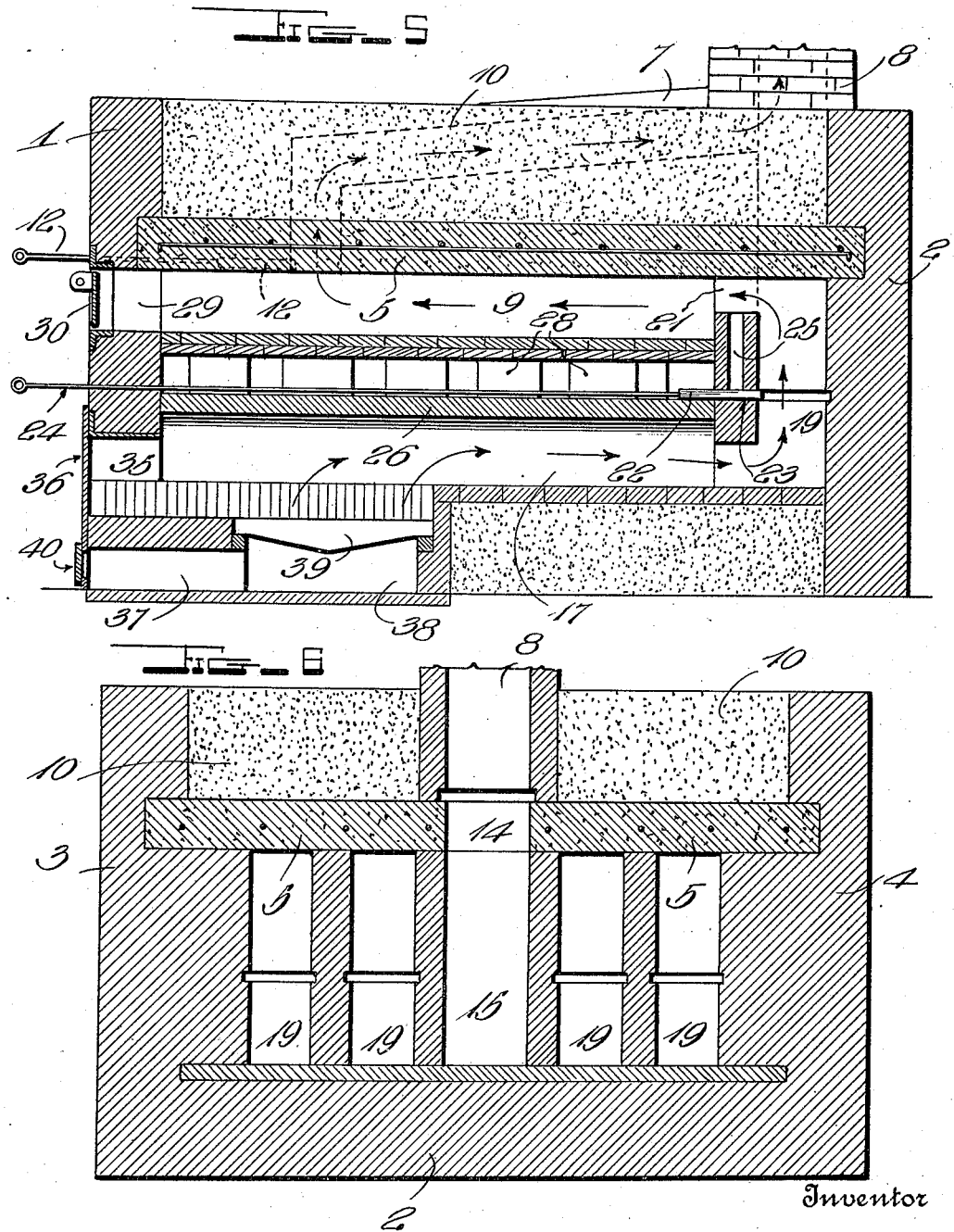

though few

UNITED STATES PATENT OFFICE.

GEORGE F. SMITH, OF BALTIMORE, MARYLAND.

BAKER'S OVEN.

1,401,823.

Specification of Letters Patent.   Patented Dec. 27, 1921.

Application filed April 11, 1921.   Serial No. 460,196.

*To all whom it may concern:*

Be it known that I, GEORGE F. SMITH, a citizen of the United States, residing at Baltimore, in the county of Baltimore city and State of Maryland, have invented certain new and useful Improvements in Bakers' Ovens; and I do declare the following to be a full, clear, and exact description of the invention, such as will enable others skilled in the art to which it appertains to make and use the same.

This invention relates to an improved baker's oven of the type in which it is intended to heat the baking chamber by means of what is known as flash heat. In other words, it is desired to provide an oven so constructed that when desired intense heat may be admitted to the baking chamber so that cakes, French pastries and other confections may be very quickly baked. It is further desired to provide an oven in which the articles placed in the rear portion of the baking oven will be prevented from being overcooked and thus scorched before articles placed in the forward portion of the baking oven are done.

Another object of the invention is to provide an improved draft mechanism whereby the products of combustion may be caused to pass directly from the combustion chamber into a flue communicating with the chimney or the products of combustion caused to pass into flues communicating with the baking chamber and after passing through the baking chamber pass up into a flue which communicates with the chimney.

Another object of the invention is to provide an improved type of partition between the two chambers, this partition being so constructed that a dead air space will be provided.

This invention is illustrated in the accompanying drawings, wherein:

Figure 1 is a view showing the improved oven in front elevation.

Fig. 2 is a vertical sectional view taken transversely of the oven on the line 2—2 of Fig. 3.

Fig. 3 is a longitudinal sectional view taken along the line 3—3 of Fig. 1.

Fig. 4 is a horizontal sectional view through the baking oven taken along the line 4—4 of Fig. 3.

Fig. 5 is a vertical longitudinal sectional view through the oven taken along the line 5—5 of Fig. 2.

Fig. 6 is a vertical sectional view taken along the line 6—6 of Fig. 3.

This improved baker's oven will have a body portion or housing formed of brick and provided with a forward wall 1, rear wall 2 and side walls 3 and 4. A top or roof 5 is provided with its edge portions fitting into pockets formed in the walls thus providing a roof which will be firmly held in place. This roof will be preferably formed of poured cement reinforced as shown. An opening 6 is formed in this roof adjacent the forward end thereof and a flue 7 leads from this opening 6 and communicates with the chimney 8 so that the products of combustion may pass out of the baking chamber 9 through this flue 7 into the chimney. It should be noted that the walls extend above the roof or top 5 thus providing retaining walls for a jacket 10 formed of earth or a suitable plastic. In order to control passage of products of combustion through the port 6, there has been provided a valve or damper 11, the operating handle 12 of which extends through the forward wall of the oven. There has also been provided a damper 13 for controlling the passage of smoke and other products of combustion into the chimney 8 through the opening 14 formed in the roof at the upper end of the flue 15. This flue 15 is formed in the inwardly extending thickened portion of the rear wall intermediate the width of the oven and at its lower end communicates with a port 16 which establishes communication between the flue 15 and the combustion chamber 17 in the lower portion of the oven. It will thus be seen that when the damper 13 is closed by means of the operating handle 18, the products of combustion will be prevented from passing from the combustion chamber through the flue 15 into the chimney. Upon opposite sides of the flue 15 which will be termed a smoke flue, there has been provided other flues 19 which lead from the side portions of the combustion chamber and communicates with the baking chamber 20 through the port 21 formed in the portion of the rear wall between the flues 19 and the baking chamber. Damper plates 22 are slidably mounted in slots 23 and provided with actuating rods or handles 24 so that these damper plates may be moved from the open position of Fig. 5 inwardly to a closed position and thus prevent products of combustion from passing through the flues 19. It should be noted that above the damper plates 22, the inwardly extending thickened portion of the rear wall has been provided with pockets 25 which provide air pockets serving to assist in preventing the inner portion of the baking chamber from becoming overheated.

In order to form the combustion chamber and baking chamber, there has been provided a partition having a transversely arched lower section or base portion 26 and an upper portion 27 formed in two layers and constituting the flooring of the baking compartment. This upper layer is in the form of tile which will be formed of soapstone or any other suitable material. The partition extends from one side wall to the other as shown clearly in Fig. 2 and extends from the forward wall to the rear wall as shown in Figs. 3, 4 and 5. Therefore, a dead air space will be provided between the upper and lower sections of this partition and the dead air space will serve to insulate the baking compartment from the combustion compartment. Supporting blocks or piers 28 are provided between the two sections of the partition within the dead air space and will thus serve to support the flooring of the baking chamber. In order to permit access to the side portions of the baking chamber, there has been provided doorways 29 normally closed by counterbalance swinging doors 30 and in order to light the baking chamber, there has been provided a light 31 positioned in a pocket 32 normally closed by a door 33. This door 33 may be opened when it is only desired to look into the baking chamber and it is desired to view the articles being baked without permitting the baking chamber to be cooled as might occur if one of the large doors 30 should be opened. Doorways are provided for permitting access to the side portions of the combustion chamber through the front wall, these doorways being normally closed by the closures 34. The combustion chamber is formed the full width of the oven as shown in Fig. 2 and is provided with a doorway 35 closed by a large door 36 which also serves to close the throat 37 of the ash-pit 38 provided beneath the grate 39 of the fire-box. A small door 40 is provided in the lower portion of the door 36 which may be opened so as to permit of a draft through the throat 37. When it is desired to have the fire burn brightly, this door 40 will be opened and a draft will be created through the throat and up through the ash-pit and grate 39. If coal has just been placed upon the fire, the dampers 28 will be closed and the smoke and other products of combustion will pass up through the flue 15 into the chimney. After the smoke has ceased to form, the damper 13 may be closed and the dampers 25 opened. The products of combustion will then pass through the flues 19 into the baking chamber and through the opening or port 6 into the flue 7 through which they will pass to the chimney above the closed damper 13. The baking chamber will thus be thoroughly and quickly heated. When first placing the cakes and other articles in the baking chamber, the damper 11 will be closed and this will shut off the gas and prevent the products of combustion from passing rapidly through the baking chamber. After the cakes are in place, the damper 11 will be opened and a draft of intense heat will pass through the baking chamber so that the cakes and other confections will be quickly cooked. By having the flooring above a dead air space, this flooring will be prevented from becoming overheated and by having the portions of the rear wall between the flues 19 and the baking chamber provided with the air pockets 25, these portions of the wall will be prevented from becoming overheated. The baking oven will thus operate in a very efficient manner.

I claim:

1. A bake oven having a combustion chamber and a baking chamber above the same, the rear wall of the oven being provided with a smoke flue leading from the combustion chamber and communicating with a chimney and upon opposite sides of the smoke flue provided with flues leading from the combustion chamber and communicating with the baking chamber, the portions of the rear wall between the second mentioned flues and baking chamber being provided with air pockets forming spaced apart wall sections, a conduit leading from an opening adjacent the forward end of the roof of the baking chamber and communicating with the chimney, and separate damper elements for the flues and conduit.

2. A bake oven having walls and a roof, a horizontal partition dividing the oven into a combustion chamber and baking chamber, a chimney, the rear wall having a smoke flue communicating with the chimney and combustion chamber and having other flues communicating with said chambers, the portions of the rear wall between the last mentioned flues and baking chamber and dead air space being hollow, a damper controlling communication between the chimney and smoke flue, dampers for the second mentioned flues positioned at the lower ends of the hollow portions of the rear wall, a flue leading from an opening in the forward portion of the oven roof and communicating with the chimney, and a damper controlling communication between the baking chamber and last mentioned flue.

3. A bake oven having walls and a roof, a horizontal partition dividing the oven into a combustion chamber and a baking chamber, a chimney, the rear wall having a smoke flue communicating with the chimney and combustion chamber and having other flues communicating with said chambers, a damper controlling communication between the chimney and smoke flue, dampers in the second mentioned flues, a flue leading from the oven roof and communicating with the chamber, and a damper controlling communication between the baking oven and last mentioned flue.

In testimony whereof I have hereunto set my hand.

GEORGE F. SMITH.